(12) United States Patent
Neria et al.

(10) Patent No.: US 9,985,832 B2
(45) Date of Patent: May 29, 2018

(54) METHOD AND SYSTEM FOR SYNCRONIZATION AND DISTRIBUTION OF CONFIGURATION CROSS CLUSTER WITHOUT BLOCKING

(71) Applicant: Dell Products L.P., Round Rock, TX (US)

(72) Inventors: Noa Neria, Tel Aviv (IL); Edward Tsinovoi, Ramat Gan (IL)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 15/010,290

(22) Filed: Jan. 29, 2016

(65) Prior Publication Data
US 2017/0222875 A1   Aug. 3, 2017

(51) Int. Cl.
*H04L 12/24* (2006.01)
*H04L 29/08* (2006.01)

(52) U.S. Cl.
CPC ........ *H04L 41/0816* (2013.01); *H04L 41/082* (2013.01); *H04L 67/1044* (2013.01); *H04L 67/1046* (2013.01); *H04L 67/1048* (2013.01); *H04L 67/1095* (2013.01)

(58) Field of Classification Search
CPC ............. H04L 67/1044; H04L 67/1046; H04L 67/1048; H04L 41/0816; H04L 67/1095; H04L 41/082
See application file for complete search history.

(56) References Cited

U.S. PATENT DOCUMENTS

| | | | | |
|---|---|---|---|---|
| 6,014,669 | A | * | 1/2000 | Slaughter .......... G06F 17/30581 707/610 |
| 9,489,434 | B1 | * | 11/2016 | Rath ................. G06F 17/30557 |
| 9,542,465 | B2 | * | 1/2017 | Voutilainen ........... G06F 9/5061 |
| 2003/0167322 | A1 | * | 9/2003 | Butterworth ............ H04L 41/12 709/223 |
| 2005/0125445 | A1 | * | 6/2005 | Cotner .............. G06F 17/30371 |
| 2007/0156733 | A1 | * | 7/2007 | Meyerson ........... H04L 41/5012 |
| 2010/0017644 | A1 | * | 1/2010 | Butterworth ........ G06F 11/1658 714/4.1 |
| 2017/0222875 | A1 | * | 8/2017 | Neria .................. H04L 41/0803 |

* cited by examiner

*Primary Examiner* — Jerry B Dennison
(74) *Attorney, Agent, or Firm* — Pearl Cohen Zedek Latzer Baratz LLP

(57) ABSTRACT

A method and system for synchronization and distribution of configuration cross cluster without blocking are provided herein. The method includes: responsive to detecting a node in the group of nodes of a distributed system becoming inactive, recording current operations database version as a node version of the inactive node; initiating a removal of the inactive node from the group of nodes; maintaining the version of the operations database unchanged until the inactive node is removed; enabling a change of the database version once the removal of the inactive node is completed; sending a join request once the inactive node wishes to rejoin; obtaining a list of operation objects for synchronization of the rejoining node; and accepting the rejoining node to the group, only whenever the joining node is at a same state as the nodes group, otherwise, repeating the sending of the join request until the synchronization is completed.

17 Claims, 2 Drawing Sheets

METHOD AND SYSTEM FOR SYNCRONIZATION AND DISTRIBUTION OF CONFIGURATION CROSS CLUSTER WITHOUT BLOCKING

FIELD OF THE INVENTION

The present invention relates generally to the field of distributed file systems, and more particularly such systems implemented as a clustered node system.

BACKGROUND OF THE INVENTION

In a clustered node system, some cluster-wide operations, such as configuration operations, require changing the local state of each node in the cluster. In cluster systems with extensive configuration, updating the local state of a node may involve multiple changes and a large number of objects.

For example, a clustered Network Attached Storage (NAS) system manages many Network Files System (NFS) exports, being the objects. These objects reside in large configuration files on the nodes, and are updated as part of some configuration changes. Another example is network configuration, which is defined locally on each node in the cluster and consists of many objects and files.

A problem may occur when one or more of the nodes in the cluster is not available during the operation. The local configuration of these nodes can be be updated before they are returned to the cluster. Therefore, cluster operations and node synchronization co-exist in a clustered node system, both accessing the same cluster configuration and other cluster resources.

However, extensive operations in clustered node systems stretch over long times and typically cannot be treated as atomic operations. Similarly, the corresponding synchronization of a node can also take a long time.

Some known methods for solving the problem of concurrent cluster operations and node synchronization block cluster-wide operations in the case that not all the nodes are available. This can be done in order to, for example, avoid inconsistency between the configurations of the nodes. One disadvantage is of this approach is that new operations in the cluster typically cannot start until one or more nodes are synchronized and returned to the cluster.

Other known methods block node synchronization during cluster-wide operations. One disadvantage with these methods is reduced performance of the cluster, as, for example, one or more nodes cannot serve clients.

SUMMARY OF THE INVENTION

Some embodiments of the present invention provide method and system for synchronization and distribution of configuration cross cluster without blocking. The method includes the following steps: detecting a node in a group of nodes of a distributed system, becoming an inactive node; recording a current operations version of the group of nodes, responsive to the detecting of the inactive node; initiating a removal of the inactive node from the group of nodes; maintaining the group of nodes at the current operations version until the removal of the inactive node is completed; enabling a change of the current operations version into an updated operations version once the removal of the inactive node is completed; receiving a join request initiated by the inactive node; obtaining a list of operation objects required for synchronization of the inactive node by comparing the recorded current operations version to the updated operations version; synchronizing an operational state of the inactive node based on the obtained list of operation objects; and accepting the inactive node back to the group of nodes only when the operational state of the inactive node is identical to the operational state of the group of nodes, otherwise, repeating the obtaining and the synchronizing.

According to some embodiments of the present invention, the synchronizing of the inactive node is carried out while enabling further updating of the updated operations version until the synchronizing is completed.

According to some embodiments of the present invention, the further updating of the updated operations is responsive to cluster operations carried out by the group of nodes.

According to some embodiments of the present invention, the synchronizing of the inactive node comprises identifying configuration changes and applying a subset of the identified changed to the inactive node.

According to some embodiments of the present invention, the accepting of the inactive node back to the group of nodes is carried out based on a decision session, wherein the nodes of the group of nodes are operationally locked during the decision session.

In accordance with embodiments of the present invention, the functionality of the clustered group of nodes takes precedence over the rejoining node.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
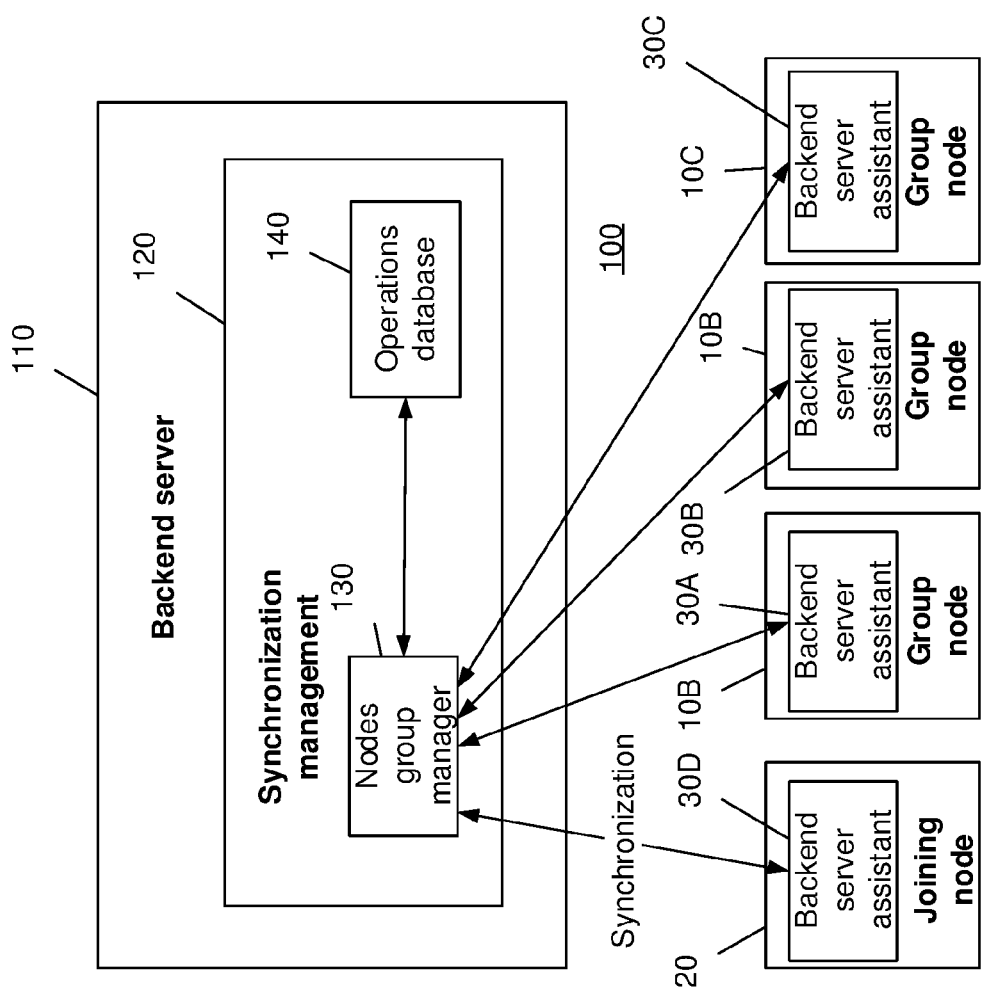
FIG. 1 is a block diagram illustrating non-limiting exemplary architecture of a device in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating non-limiting exemplary architecture of a clustered nodes system 100 in accordance with embodiments of the present invention. Clustered nodes system 100 a backend server 110 and a plurality of nodes such as 10A-10C and 20. Backend server 110 includes a synchronization management unit 120 that can enable the clustered nodes system to perform both cluster wide and/or local node operations, even if one of the nodes such as node 20 in the cluster is unavailable or fails during the operation. Once the failed node is back up, it can be automatically updated with the operations that were performed. Same logic can be applied for any new node joining the cluster.

Synchronization management unit 120 can allow for operations in the cluster during every or substantially every possible state of the failed node (e.g. node 20), e.g, when the node is down, being synchronized or returned to the cluster. A recovered node can be updated and return to work during cluster operations. As cluster performance increases with the number of the nodes, another advantage is that cluster performance is not (or substantially not) compromised by operations in the cluster.

The essence of some embodiments of the present invention is the iterative process to join a node in the presence of cluster operations, as described below.

System Layout

Cluster-wide operations can be performed centrally by a backend server 110. Backend server 110 controls a group of backend server assistants 30A-30D—one on each node 10A-10C and 20, respectively. Backend server assistant 30A-30D can act as the node's local process which implements the operations of backend server 110 locally.

In accordance with embodiments of the present invention, backend server 10 can run on one of the nodes in the cluster. Each node 10A-10C, and 20 in the cluster can run a backend server assistant 30A-30D that handles operations, synchronization and/or requests from and to the backend server.

In accordance with embodiments of the present invention synchronization management unit 120 is part of the backend server 110, and includes of the nodes group manager 130 and the operations database 140.

In accordance with embodiments of the present invention, nodes group manager 130 manages the group of available updated nodes and/or the synchronization of nodes outside the group.

In accordance with embodiments of the present invention, operations database 140 records the current configuration of the cluster and the current database version. Every cluster operation can consist of an operative stage that performs the actual change, followed by an increase in the database version. The operation database manages a version per object type.

The operations database 140 can be used by the nodes group manager 130 to calculate the object types that need synchronization, in order to synchronize nodes outside the group.

Efficient Synchronization

In accordance with embodiments of the present invention, the join process can use the versioning system of the operations database to perform efficient synchronization, as described below.

When one of the nodes (e.g. node 20) in the group becomes inactive (failed), the group manager 130 can record the current operations database version as the node version of the inactive node, and remove the inactive node from the group. In some embodiments, the version of the operations database does not change until the inactive node is removed from the nodes group, e.g., no additional operations can be completed until the group manager has removed the inactive node. Once node 20 is removed, additional operations can progress and the database version may increase. This can ensure that all (or substantially) the additional operations are synchronized when the node becomes active.

When the failed node 20 is up and ready to join the cluster, the backend server assistant 30D of the node can send join request to the group manager 130 in the backend server 110. Once a join request is received, the group manager 130 can request from the operations database 140 the list of operation objects required for the synchronization of the joining node. The list of objects can be obtained by comparing the recorded node version to the current version of the operations database. Once the synchronization is complete, i.e. the joining node 20 can be at the same state as the nodes group 10A-10C, the joining node can be accepted to the group and the node version record is removed.

The Join Process

In accordance with some embodiments of the present invention, the essence is the algorithm to synchronize the local state of the node in parallel to any ongoing update in the cluster. Since operations and synchronization are considerably long, blocking is typically not adequate. Instead, joining a node can be an iterative process, which gives priority to cluster updates over node synchronization.

Operations may take place during the time it takes to synchronize the joining node. Such operations are called ongoing operations. Therefore, the version of the operations database can be checked again after the synchronization of the joining node. If the version had changed, the required synchronization can be carried out and the version is checked again, until the joining node is fully synchronized. In addition, node synchronization can be parallel to the synchronization of any other node outside the cluster.

Each iteration of the join process starts by identifying the configuration changes for efficient synchronization. Then, only the identified changes are made in the node. When synchronization is over, the joining node can be checked again against the current configuration of the cluster. This is because updates may occur during the synchronization. If there are new updates, the join process can be repeated for the new changes only. The node can be joined when the local state of the node is fully synchronized with the cluster configuration. The join is expected to succeed eventually, due to, for example, the efficient synchronization (e.g. object types to synchronize are recalculated at the beginning of the iteration).

In accordance with embodiments of the present invention the decision algorithm of the group manager is separated from the actual synchronization of the node. The actual synchronization, which can be the time consuming part of the join process, can be carried out completely in parallel to the cluster operations. However, both cluster operations and the decision algorithm share the nodes group. The decision algorithm can lock the nodes group for read/write for a minimal time, while the group manager can examine the database version and the ongoing operations and can decide whether to synchronize or accept the node to the group. During these very short times, in some embodiments, ongoing operations cannot advance, because cross cluster operations need access to the nodes group. This can ensure that there is no change (or substantially no change) in the state of the cluster during the very short time it takes to run the decision algorithm.

State Machine of the Joining Process

Figure 2:
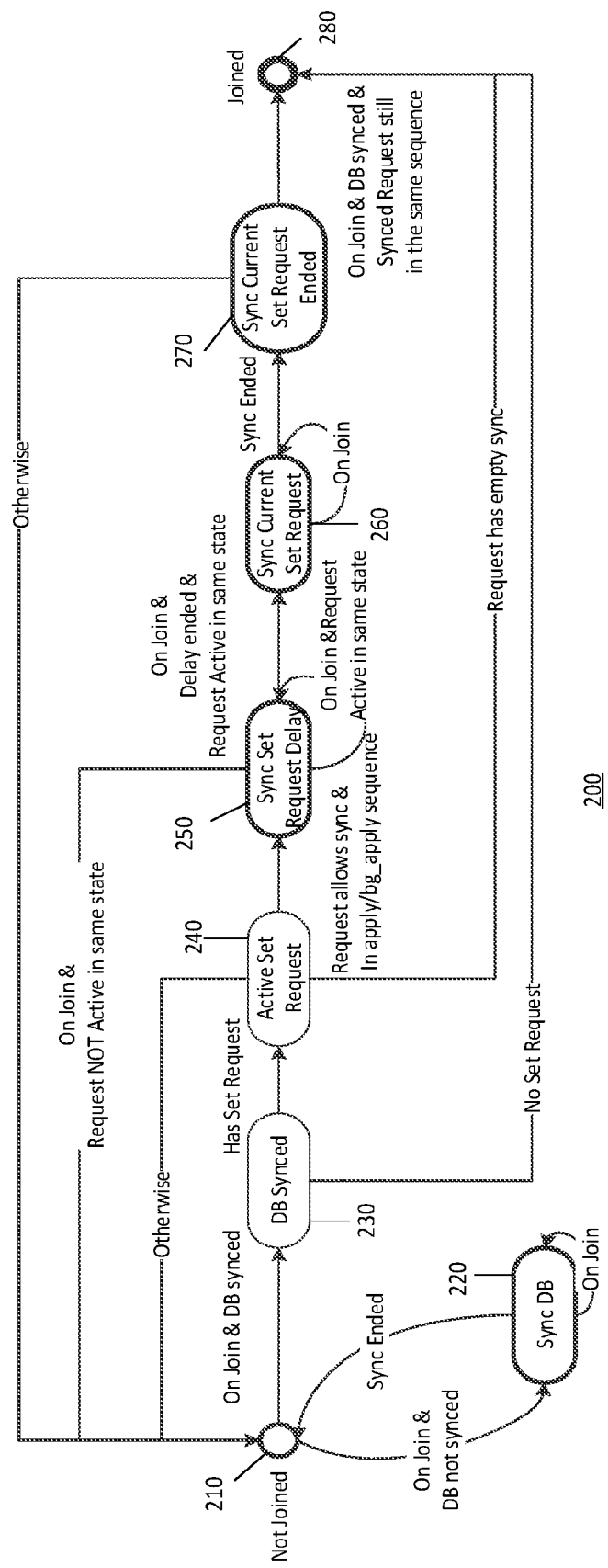
FIG. 2 is a state machine diagram illustrating the method in accordance with embodiments of the present invention.

FIG. 2 is a state machine diagram 200 illustrating the method in accordance with embodiments of the present invention. The state diagram illustrates the states and the transitions between them. The states marked with a thicker line are states in which the algorithm stays in and waits for something to happen; all other states are temporary states that the algorithm just passes through.

The state machine diagram uses the following notations:
"DB" is the configuration database
"On join" is the join request from the node to the backend server
"Active set request" is configuration change in the cluster that may occur in parallel to the join process.

Following below is the flow depicted at the exemplary state machine of FIG. 2.

1. The initial state for a node is the "Not Joined" state 210, and the final state of the algorithm is the "Joined" state 280.
2. When a join request arrives from some node the database version is checked. If it is not up to date then the process moves to "Sync DB" state 220 and start to synchronize it.
3. Once the database is up to date, the process moves to "DB Synced" state 230, and there is a check for any active request. If there isn't any active requests, then the process moves to the final state "Joined" 280 and complete.
4. If there is an active request, then the process moves on to "Active Set Request" state 240. If the request does not require synchronization of local changes, the process moves to the final state 280 and complete. If the request doesn't allow synchronization then the process waits for it to complete, so the process goes back to the initial state 210. The next join request starts the algorithm all over.
5. If the request allows synchronization, then the process moves to "Sync Set Request Delay" state 250. While the delay period hasn't passed, it is verified that the same request is still active in the same state as it was, if it isn't the process go back to the initial state 210.
6. If the delay passed, and the request is still active in the same state, the synchronization starts with it in the state "Sync Current Set Request" 260. Once the synchronization is completed, the process moves to "Sync Current Set Request Ended" 270.

Embodiments of the present invention allow a node to join the cluster while operations are being carried out on the nodes group. However, the group manager may prevent a node from joining during the performing of operations on the nodes group, unless these operations specifically allow the simultaneous joining of a node. This is because, in the general case, the operations themselves do not take into account a possible change in the nodes group.

Usually, the group manager denies the join request if there are ongoing operations that perform local changes on the nodes. However, if all the ongoing operations allow the join request, the group manager will safely join the node. To that effect, the node can be joined only if all the ongoing operations are still in the operative stage. The operative stage is the part of the operation that actually performs the change on the nodes group (e.g., changing of IP addresses has a configuration stage followed by an operative stage of the actual changing of the IP addresses). If the operative stage is over, the group manager can wait until the database version is updated and synchronizes the node as described above. In other words, the join can be blocked if there is any ongoing operation that has finished the operative stage but not yet updated the operations database version. This can ensure that the ongoing operation is performed on the joining node, either together with the nodes group or after the operation is finished.

In accordance with embodiments of the present invention, an implementation using non-transitory computer is also possible. A non-transitory computer readable medium includes a set of instructions that when executed cause at least one processor to: responsive to detecting a node in the group of nodes of a distributed system becoming inactive, record current operations database version as a node version of the inactive node; initiate a removal of the inactive node from the group of nodes; maintain the version of the operations database unchanged until the inactive node is removed from the nodes group; enable a change of the database version once the removal of the inactive node has been completed; send a join request once the inactive node wishes to rejoin the group; obtain a list of operation objects required for the synchronization of the rejoining node by comparing the recorded node version to the current version of the operations database; and accept the rejoining node to the group and removing the node version record, only whenever the joining node is at a same state as the nodes group, otherwise, repeating the sending of the join request.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   detecting a node in a group of nodes of a distributed system, becoming an inactive node;
   recording a current operations version of the group of nodes, responsive to the detecting of the inactive node;
   initiating a removal of the inactive node from the group of nodes;
   maintaining the group of nodes at the current operations version until the removal of the inactive node is completed;
   enabling a change of the current operations version into an updated operations version once the removal of the inactive node is completed;
   receiving a join request initiated by the inactive node;
   obtaining a list of operation objects required for synchronization of the inactive node by comparing the recorded current operations version to the updated operations version;
   synchronizing an operational state of the inactive node based on the obtained list of operation objects; and
   accepting the inactive node back to the group of nodes only when the operational state of the inactive node is identical to the operational state of the group of nodes, otherwise, repeating the obtaining and the synchronizing.

2. The method according to claim 1, wherein the synchronizing of the inactive node is carried out while enabling further updating of the updated operations version until the synchronizing is completed.

3. The method according to claim 2, wherein the further updating of the updated operations is responsive to cluster operations carried out by the group of nodes.

4. The method according to claim 1, wherein the synchronizing of the inactive node comprises identifying configuration changes and applying a subset of the identified changed to the inactive node.

5. The method according to claim 1, wherein the accepting of the inactive node back to the group of nodes is carried out based on a decision session, wherein the nodes of the group of nodes are operationally locked during the decision session.

6. A system comprising:
   a group of nodes in a distributed system; and
   a nodes group manager executed by a computer processor configured to:
      detect a node in the group of nodes becoming an inactive node;
      record a current operations version of the group of nodes, responsive to the detecting of the inactive node;
      initiate a removal of the inactive node from the group of nodes;
      maintain the group of nodes at the current operations version until the removal of the inactive node is completed;
      enable a change of the current operations version into an updated operations version once the removal of the inactive node is completed;
      receive a join request initiated by the inactive node;
      obtain a list of operation objects required for synchronization of the inactive node by comparing the recorded current operations version to the updated operations version;
      synchronize an operational state of the inactive node based on the obtained list of operation objects; and
      accept the inactive node back to the group of nodes only when the operational state of the inactive node is identical to the operational state of the group of nodes, otherwise, repeating the obtaining and the synchronizing.

7. The system according to claim 6, wherein the synchronizing of the inactive node is carried out while enabling further updating of the updated operations version until the synchronizing is completed.

8. The system according to claim 6, wherein the further updating of the updated operations is responsive to cluster operations carried out by the group of nodes.

9. The system according to claim 6, wherein the synchronizing of the inactive node comprises identifying configuration changes and applying a subset of the identified changed to the inactive node.

10. The system according to claim 6, wherein the accepting of the inactive node back to the group of nodes is carried out based on a decision session, wherein the nodes of the group of nodes are operationally locked during the decision session.

11. The system according to claim 6, wherein the nodes group manager is implemented on a backend server.

12. The system according to claim 11, wherein the nodes group manager controls the nodes via an assistant server assistant being a process running on the nodes and controlled by the backend server.

13. A non-transitory computer readable medium comprising a set of instructions that when executed cause at least one processor to:
  detect a node in the group of nodes becoming an inactive node;
  record a current operations version of the group of nodes, responsive to the detecting of the inactive node;
  initiate a removal of the inactive node from the group of nodes;
  maintain the group of nodes at the current operations version until the removal of the inactive node is completed;
  enable a change of the current operations version into an updated operations version once the removal of the inactive node is completed;
  receive a join request initiated by the inactive node;
  obtain a list of operation objects required for synchronization of the inactive node by comparing the recorded current operations version to the updated operations version;
  synchronize an operational state of the inactive node based on the obtained list of operation objects; and
  accept the inactive node back to the group of nodes only when the operational state of the inactive node is identical to the operational state of the group of nodes, otherwise, repeating the obtaining and the synchronizing.

14. The non-transitory computer readable medium according to claim 13, wherein the synchronizing of the inactive node is carried out while enabling further updating of the updated operations version until the synchronizing is completed.

15. The non-transitory computer readable medium according to claim 13, wherein the further updating of the updated operations is responsive to cluster operations carried out by the group of nodes.

16. The non-transitory computer readable medium according to claim 13, wherein the synchronizing of the inactive node comprises identifying configuration changes and applying a subset of the identified changed to the inactive node.

17. The non-transitory computer readable medium according to claim 13, wherein the accepting of the inactive node back to the group of nodes is carried out based on a decision session, wherein the nodes of the group of nodes are operationally locked during the decision session.

\* \* \* \* \*